United States Patent

[11] 3,558,990

[72] Inventor Hans Jurg Bossi
Nussbaumen, Switzerland
[21] Appl. No. 708,368
[22] Filed Feb. 26, 1968
[45] Patented Jan. 26, 1971
[73] Assignee Aktiengesellschaft Brown Boveri & Cie
Baden, Switzerland
a joint stock company
[32] Priority Aug. 17, 1967
[33] Germany
[31] A56524

[54] ARRANGEMENT FOR PROTECTING SEMICONDUCTOR DEVICES CONNECTED IN PARALLEL FROM HOLE-STORAGE VOLTAGE SURGES
3 Claims, 4 Drawing Figs.

[52] U.S. Cl. .......... 317/43, 307/93, 317/52
[51] Int. Cl. .......... H02h 3/18
[50] Field of Search .......... 317/43 (Cursory), 52; 321/27, 11; 307/93

[56] References Cited
UNITED STATES PATENTS
3,332,000 7/1967 Greening et al. .......... 317/43X
3,416,002 12/1968 Faust .......... 317/43X

*Primary Examiner*—James D. Trammell
*Attorney*—Pierce, Scheffler and Parker

ABSTRACT: In a circuit arrangement wherein a plurality of semiconductor devices such as diodes and thyristors are electrically connected in parallel to divide the load between them, a single capacitor unit provides protection against hole-storage voltage surges and is located at, and connected in parallel with, that particular one of the semiconductor devices where the current distribution between the devices in the forward direction has its lowest value.

INVENTOR.
Hans Jürg Bossi
BY
Pierce, Scheffler & Parker
Attorneys

INVENTOR.
Hans Jörg Bossi
BY
Pierce, Scheffler & Parker
Attorneys

ARRANGEMENT FOR PROTECTING SEMICONDUCTOR DEVICES CONNECTED IN PARALLEL FROM HOLE-STORAGE VOLTAGE SURGES

The invention concerns an arrangement with semiconductor devices connected in parallel, a common capacitor being included in the circuit in order to provide protection against hole-storage voltage surges. Arrangements of this kind already known often possess disadvantages; particularly when a relatively large number of parallel semiconductor devices (e.g. diodes or thyristors) are used, it is found that the most favorable mode of operation is attained when the capacitor included in the circuit to protect the diodes is located immediately next to the device whose reverse recovery current cuts off. Since each device is at some time in this situation, however, it appears at first sight that this requirement can be met only by dividing the common capacitor into a number of individual capacitors connected in parallel, each capacitor being allocated to one semiconductor device.

This solution is also well known, but has the obvious disadvantages of great complexity and high cost.

This purpose of the invention is to create an arrangement which, though a single protective capacitor is used, nevertheless achieves the same effect as when separate capacitors are allotted to each individual semiconductor device. According to the invention, this is achieved by fitting the common capacitor at that point where the current distribution is shown to have its lowest values.

A procedure for setting up an arrangement in accordance with the invention is characterized by the fact that the current distribution in the semiconductor devices is measured with a current-measuring device and the minimum determined, whereupon the common capacitor is moved to that semiconductor device at which this minimum was measured, and there fixed.

Figure 1A:
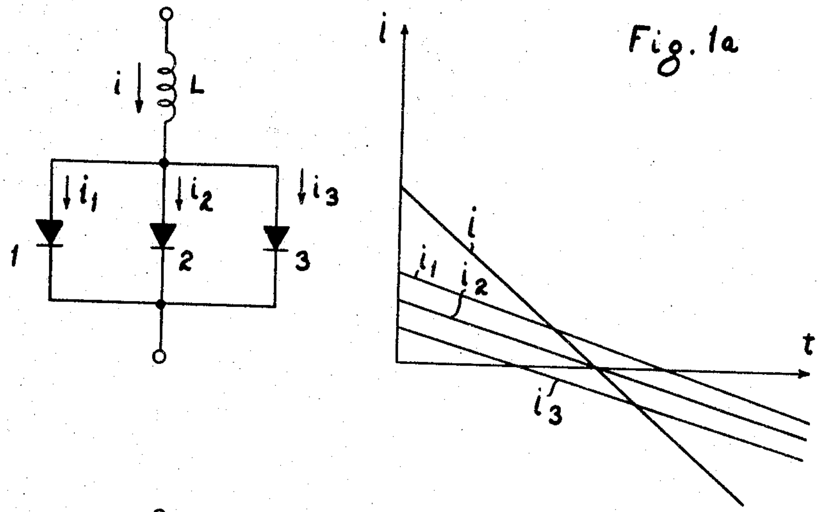
Figure 1B:
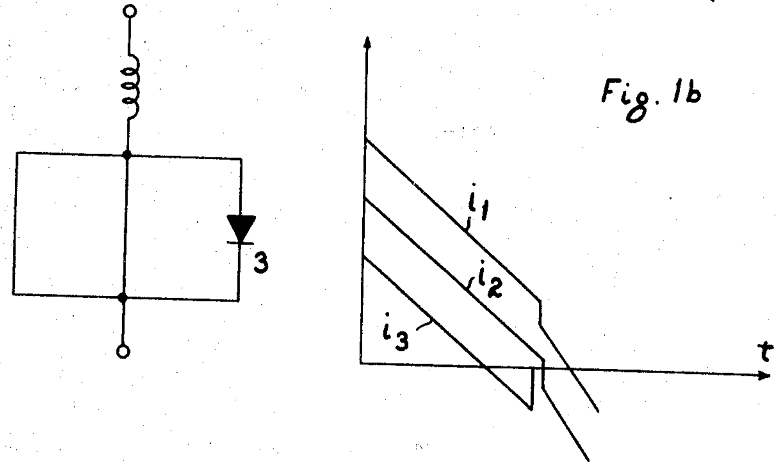
Figure 2:
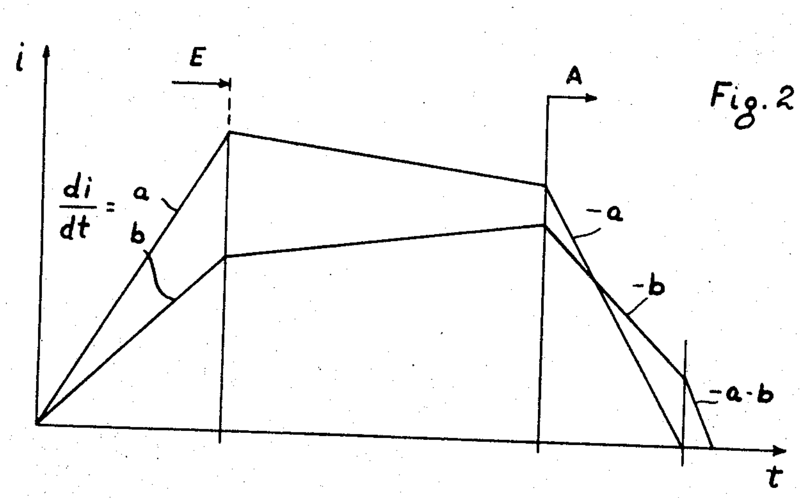
Figure 3:
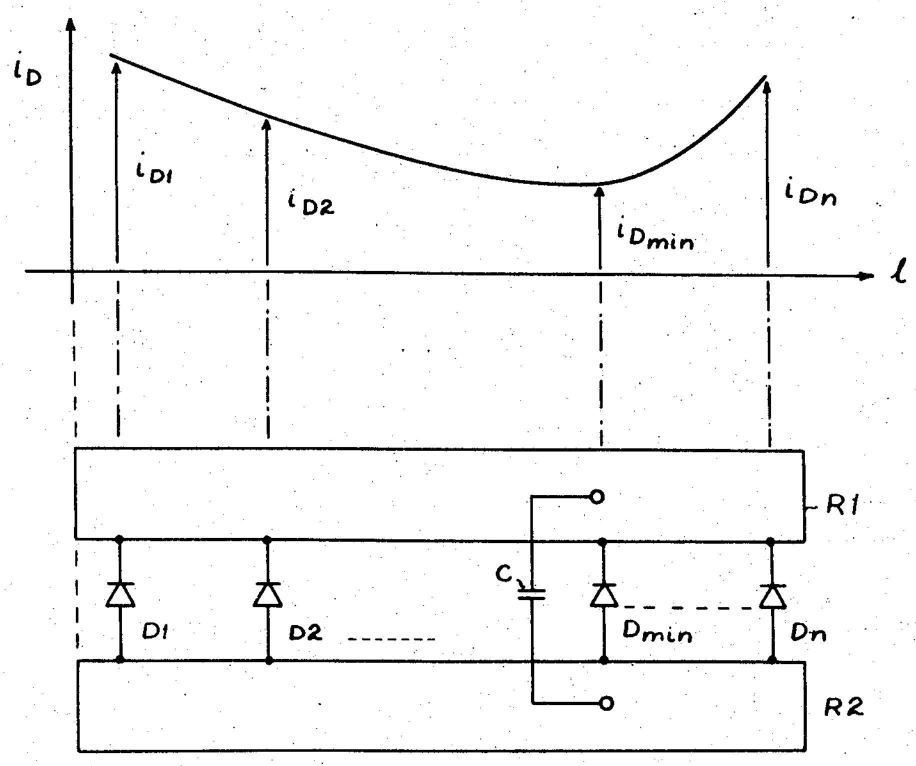

The invention is explained more fully below with the aid of the diagrams. These Show:

FIG. 1*a*, a diagram of the individual currents in parallel-connected semiconductor devices before the current cuts off on in one of these devices, FIG. 1*b*, an equivalent circuit for the cutoff process in one device as in FIG. 1*a*, FIG. 2, a current diagram for two diodes, the current distribution of which is determined by means of inductances, FIG. 3 an embodiment of the invention wherein the common capacitor is movable along a rail to the desired position wherein the current in the forward direction from all of the parallel connected semiconductor devices has the lowest value.

As the curves of current in FIG. 1*a* and 1*b* show, with several parallel devices it is possible to predict in which device or devices the reverse recovery current cutoff last. As can be seen, the time sequence is as follows: $i_3$, $i_2$, $i_1$. Here, L is the inductance created by the conductor loop. It is intended to schematically represent the lumped inductance of transformers and the like of the line circuit. The voltage together with this inductance determines the steepness of current increase and decrease i.e. $di/dt$. If, however, the cutoff is staggered in time, those devices which cutoff later act as an RC or C network in the sense of a short circuit for those devices which cutoff first (see FIG. 1*b*). It is thus clear that only the last devices to cutoff are fully subjected to hole-storage voltage surges; with the other devices, these voltage surges occurring in consequence of the hole-storage effect are "short-circuited" by the devices still carrying current, and so rendered harmless.

It is known that with many devices in parallel the current distribution is determined chiefly by the inductive conditions, while differences in the forward voltage drop, if certain limits are not exceeded, play only a minor role. Clearly, the inductive conditions are of influence when the change of current is greatest, during the switching process. The current differences existing at the end of the turn on process E are again partly compensated during the actual duty cycle (FIG. 2). Thus, when the turn off process takes place A, the current in those devices having a higher mean loading will first pass through zero and then cutoff. The time differences caused by the current distribution when the reverse recovery current cuts off are here greater than those which can be caused by differences between devices (unequal quantity of stored charge carriers). Therefore, places with a low mean current are the correct position for a common RC or C network.

If it is desired to connect the capacitor at the correct position in an existing piece of equipment containing parallel connected semiconductor devices (like diodes and thyristors), the current distribution is first determined by means of a suitable measuring instrument. For convenience, the capacitor is so arranged as to be movable, e.g. on a rail, so that when the minimum current in the forward direction has been determined, the capacitor can be moved to the appropriate device, and there fixed. A movable capacitor has the added advantage that with a comparatively small number of semiconductor devices—in which case the current distribution is no longer determined solely by the inductive loadings, but also to some extent by the characteristics of the devices themselves (forward voltage drop)—the position of the capacitor can subsequently be altered if, for example, individual semiconductor devices have to be replaced.

In FIG. 3 which depicts the above-described embodiment, the plurality of semiconductor devices arranged in parallel are designated D1, D2., D*min*.. D*n*, and are connected across two bus rails R1, R2. The respective current flow amplitudes in the forward direction are designated *i*D1, *i*D2, *i*D*min*....*i*D*n* in the current flow curve plotted above the rail. In accordance with the invention the common capacitor C in parallel with the semiconductor devices is located at that particular device D*min* wherein the current flow in the forward direction, as represented by the current distribution curve has its lowest value, i.e. *i*D*min*.

I claim:

1. In a circuit arrangement comprising a plurality of semiconductor devices connected in parallel, the method of protecting said devices against hole-storage voltage surges which comprises the steps of measuring the forward current distribution in each of the devices to determine which has the lowest current value and placing a capacitor at the location of and in parallel with that device which has the lowest forward current value.

2. In a circuit arrangement comprising a plurality of semiconductor devices connected in parallel to divide the load between them, the improvement which comprises the inclusion in said circuit of a single capacitor unit providing protection against hole-storage voltage surges, said capacitor being located at that particular one of said semiconductor devices where the current distribution between the devices in the forward direction has its lowest value and connected in parallel therewith.

3. A circuit arrangement as defined in claim 2 wherein said semiconductor devices are connected in spaced relation along rail means, and said single capacitor unit is movable along said rail means to the location of the semiconductor device which is carrying the lowest value of the forward current.